Nov. 27, 1962   F. M. FRANKHOUSER ET AL   3,065,997
VEHICLE BRAKE OPERATOR
Original Filed Jan. 11, 1960
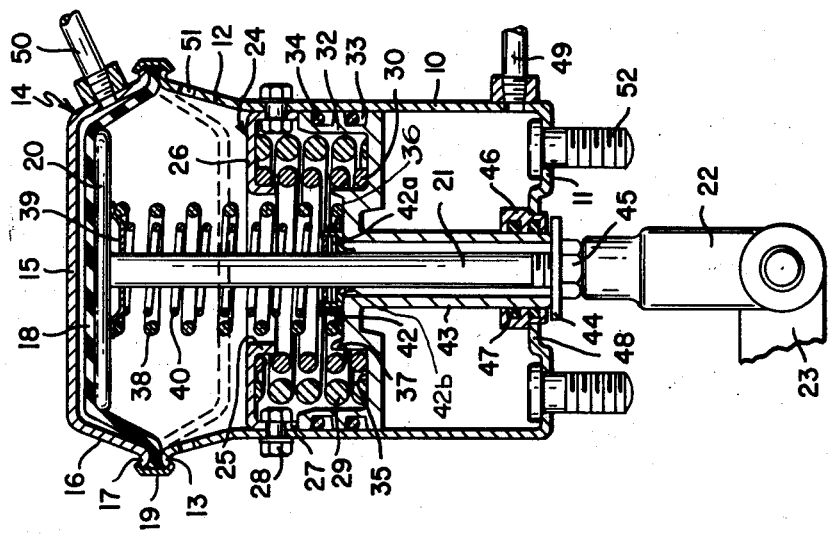
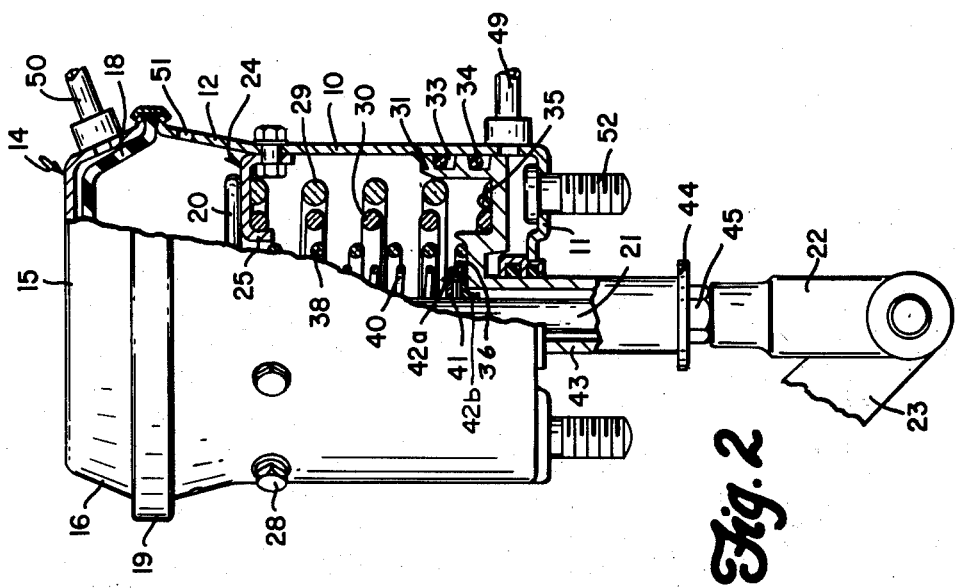
INVENTORS.
CHARLES G. WEARDEN
FREDERICK M. FRANKHOUSER
DANIEL O. CLARK
BY
*Malcolm W. Fraser*
ATTORNEY 3,065,997
VEHICLE BRAKE OPERATOR
Frederick M. Frankhouser, Pasadena, Daniel O. Clark, San Marino, and Charles G. Wearden, Rosemead, Calif., assignors, by mesne assignments, to Gustin-Bacon Brake Company, Kansas City, Mo., a corporation of Delaware
Continuation of abandoned application Ser. No. 1,509, Jan. 11, 1960. This application Jan. 8, 1962, Ser. No. 173,085
7 Claims. (Cl. 303—6)

This invention relates to vehicle brake operating mechanisms particularly of the type in which the brake is normally operated as a service brake by fluid under pressure but upon failure of the pressure fluid or in the event the pressure is reduced below a predetermined point, the brake is automatically applied, thereby not only providing a desirable brake operator for parking purposes but also as a safety precaution.

This application constitutes a continuation of our application Serial No. 1,509 filed January 11, 1960 now abandoned.

An object is to produce an efficient brake operator of the above type which is simple in construction, easy to assemble, reliable in operation, and has the new and improved features of construction and operation hereinafter described.

A further object of this invention is to provide a brake operating mechanism of extremely compact construction occupying a minimum of space and which can be readily attached to an existing truck brake operating mechanism.

Still a further object of this invention is to provide novel means in such brake operating mechanism as to prevent pivoting or binding of the operating rod.

Other objects and advantages of the invention will hereinafter appear and for purposes of illustration, but not of limitation, an embodiment of the invention is shown on the accompanying drawings in which FIGURE 1 is a longitudinal section view of the vehicle brake operating mechanism connected to a brake operating arm and showing in full lines the position of the parts in the brake-off position; and FIGURE 2 is a fragmentary sectional view of the vehicle brake operating mechanism shown in FIGURE 1, but showing how the spring device automatically applies the brake.

The illustrated embodiment of the invention comprises an elongate cup-shaped cylindrical housing 10 of sheet metal which has a bottom end wall 11 and an outwardly flared upper end portion 12. At the free end of the flared portion 12 is a flange 13 which is curved or inclined downwardly. The open mouth of the housing 10 is closed by an inverted cup-shaped member generally indicated at 14 and also formed from sheet metal. The closure 14 has a flat end wall 15 and a latterly flared annular side wall portion 16, at the mouth of which is a flange 17 which is upwardly curved or inclined. Clamped between the flanges 13 and 17 is the edge portion of a substantially disc-shaped flexible diaphragm 18. By latterly flaring the walls 12 and 16, a substantially larger diaphragm can be used. For retaining the cup-shaped closure 14 against the housing 10 and for clamping the diaphragm 18 in place, an annular sheet metal band 19 surrounds the juncture of these parts and is crimped over the flanges 13 and 17.

Abutting the under face of the diaphragm 18 is a round or disc-like pad 20 and rigidly fixed to the central portion of the pad 20 and extending longitudinally of the housing 10 is an operating rod 21, which projects through the end wall 11 of the housing and has secured thereto a clevis 22 which is pivotally connected to an arm 23 forming a part of the vehicle brake mechanism, it being understood that by slight rocking movement of the arm 23, the brake is applied. Manifestly by introducing air under pressure to the upper side of the diaphragm 18, the rod 21 is shifted longitudinally to effect such brake operation under service conditions.

Arranged within the housing 10 and adjacent the juncture of the latterly flared portion 12 is a sheet metal annulus 24 which on the inner edge has a depending flange 25. The main body of the annulus is formed with a flat wall 26 and at the outer edge of the annulus is a depending flange 27 somewhat longer than that of the flange 25, which abuts against the inner wall of the housing 10. Formed in the flange 27 is a series of equidistantly spaced holes which register with holes in the wall of the housing 10 and through these registering holes extend bolt and nut assemblies 28 for securely connecting the annulus 24 to the housing. Seated against the flat wall 26 of the annulus on the lower side thereof are concentric coil springs 29 and 30, the spring 29 being substantially stronger than the spring 30. The downturned flange 25 militates against the springs creeping from the annulus.

The opposite ends of the coil springs 29 and 30 abut against a piston 31 which has an elongate upwardly extending outer flange or wall portion 32, partitioned to provide a pair of annular grooves in which are disposed O rings 34 to establish a satisfactory sliding seal between the piston and the inner wall of the housing 10. The ends of the coil springs 29 and 30 seat in a countersunk annular socket 35 in the piston and adjacent the socket 35 on the inner portion of the piston is a flat supporting surface 36 which has an upwardly extending annular retaining ridge 37 at the outer edge thereof. Seated against the flat surface 36 is a coil spring 38, the opposite end of which abuts against the depressed flanged periphery of an abutment plate 39 which fits over the rod 21 and bears against the underface of the diaphragm-engaging pad 20. Concentric with and spaced inwardly from the coil spring 38 is a coil spring 40 which is substantially weaker than that of the spring 38. The spring 40 bears against the flat raised portion of the abutment plate 39 at one end and the opposite end bears against a laterally extending annular flange 42 which forms a part of a guide device 42a embracing the actuating rod 21. The device 42a bears against the surface 36 and is equipped with felt washers or the like 42b, engaging the rod to serve as a dust seal.

Integral with the piston 31 and concentric thereof is a rigid sleeve extension 43 through which the rod 21 freely extends and the free end of the extension projects slightly outside of the housing 10. The free end of the sleeve 43 engages a disc or washer 44 carried by the actuating rod 21, the washer 44 engaging an adjusting nut 45 engaging a screw-threaded portion of the rod 21.

The sleeve extension 43 has a sliding fit with a sealing ring cage 46 which has a pair of vertically spaced annular grooves to receive O rings 47 engaging the outer surface of the sleeve extension 43 and effecting a fluid tight joint therewith. The cage 46 extends inside of the housing 10 and is carried by a depressed portion 48 of the bottom end wall 11, the portion 48 being apertured to receive a shouldered portion of the cage 46 which is mounted in place from the inside of the housing.

Air under pressure is introduced to the inside of the housing 10 through a tube 49 arranged adjacent the bottom end wall 11 and is introduced through the end closure 14 by a tube 50. It will be understood that the air pressure in the tubes 49 and 50 is the same and this pressure is sufficient to force the piston upwardly to the position shown in FIGURE 1 compressing the coil springs 29 and 30. So long as the pressure is maintained, these springs are retained under compression. However, in the event that the air pressure is reduced or is shut off, then the coil springs 29 and 30 operate abruptly and automatically to move the piston 31 downwardly of the housing 10 so that the end of the sleeve extension 43 acting against the disc 44 moves the actuating rod 21, clevis 22 and arm 23 to apply the vehicle brake. At this time the pad 20 bottoms or abuts against the upper side of the annulus 24 as shown in FIGURE 2. The brake is maintained on until sufficient air pressure introduced through the tube 49 shifts the piston 31 and again compresses the springs 29 and 30.

Air under ordinary service conditions is introduced through the tube 50 to flex the diaphragm 18 and thereby shift the operating rod 21 for applying the vehicle brake. Air beneath the diaphragm is vented to the atmosphere through vent openings 51 in the flared end portion 12 of the housing, thereby enabling the diaphragm to move freely. When the compressed air is shut off from the tube 50, the diaphragm 18 is returned to its normal position and the actuating rod retracted by the springs 38 and 40. During this time sufficient air under pressure is admitted through the tube 49 to keep the piston retracted and the springs 29 and 30 compressed.

The brake operator assembly is mounted in position of use by a series of stud bolts 52 carried by the housing end wall 11.

The above described assembly is not only sturdy and reliable in operation but is exceedingly compact and of minimum length so that it can be readily installed on most trucks without making changes in the original mounting brackets. The assembly of the parts is simplified, it being understood that after the piston 31 is installed within the housing 10, the annulus which provides a seat for one end of each of the springs 29 and 30, is mounted conveniently on the inside of the housing. By forming the housing 10 from a single piece of sheet metal by deep-drawing the same, the manufacturing cost is reduced.

While what hereinbefore has been described as the preferred embodiment of this invention, it is readily apparent that alterations and modifications may be resorted to without departing from the scope of this invention and such alterations and modifications are intended to be included within the scope of the appended claims.

We claim:

1. Brake actuating mechanism comprising a closed housing having inner and outer end walls, a flexible diaphragm within said housing and peripherally secured in place, means for introducing fluid under pressure to said housing adjacent the inner end wall thereof and at one side of said diaphragm, a brake operating rod on the other side of said diaphragm and axially arranged relative thereto, a pad on the end of said rod abutting said diaphragm, said rod projecting through the outer end wall of said housing for reciprocatory movements, coil spring means bearing at one end against said pad for urging said rod and the diaphragm in a direction toward the inner end wall of the housing, a stop plate in the form of an annulus through which said coil spring means extends, said stop plate being disposed within the housing and bolted to the walls thereof, a piston slidably mounted within the housing and having an annular countersunk portion and a concentric spring seat portion within said countersunk portion, the opposite end of said coil spring means bearing against said spring seat portion, compression spring means bearing at one end against said stop plate and at the opposite end against the countersunk portion of said piston for urging the latter toward the outer end of said housing, said stop plate having an inner flange for confining the respective end of the compression spring means, a sleeve extension integral with said piston and through which said rod extends, a fluid seal between the outer end wall of the housing and said sleeve, an abutment on the outer end portion of said brake operating rod against which the outer end of said sleeve is engageable, and means for introducing fluid under pressure to the outer end portion of the housing for normally holding the piston in position toward the stop plate with the compression spring means in compressed condition, whereby upon failure of or predetermined reduction in fluid pressure, said compression spring means abruptly actuates the piston to cause the sleeve to shift the operating rod for brake application.

2. Brake actuating mechanism as claimed in claim 1 in which the coil spring means comprises a pair of concentric helical coil springs, a guide device fitting the brake operating rod and bearing against the piston, and a laterally extending flange on said guide device bearing against the concentric spring seat portion of the piston, the innermost of said concentric coil springs bearing at one end against said flange, the outermost of said concentric springs having one end bearing against the spring seat portion of the piston.

3. Brake actuating mechanism comprising a closed housing having inner and outer end walls, a flexible diaphragm within said housing and peripherally secured in place, means for introducing fluid under pressure to said housing adjacent the inner end wall thereof and at one side of said diaphragm, a brake operating rod on the other side of said diaphragm and axially arranged relative thereto, a pad on the end of said rod abutting said diaphragm, said rod projecting through the outer end wall of said housing for reciprocatory movements, coil spring means bearing at one end against said pad for urging said rod and the diaphragm in a direction toward the inner end wall of the housing, stop means in said housing through which said coil spring means extends, a piston slidably mounted within the housing, the remaining end of said coil spring means bearing against said piston, a compression spring bearing against said stop means and said piston, an extension integral with said piston through which said rod extends, an abutment on said brake operating rod against which said extension abuts, and means for introducing fluid under pressure to the outer end portion of the housing whereby upon failure of fluid pressure said compression spring means abruptly actuates said piston moving said operating rod for brake application.

4. Brake actuating mechanism comprising a closed housing having inner and outer end walls, a flexible diaphragm within said housing and peripherally secured in place, means for introducing fluid under pressure to said housing adjacent the inner end wall thereof and at one side of said diaphragm, a brake operating rod on the other side of said diaphragm and axially arranged relative thereto, a pad on the end of said rod abutting said diaphragm, said rod projecting through the outer end wall of said housing for reciprocatory movements, coil spring means bearing at one end against said pad for urging said rod and the diaphragm in a direction toward the inner end wall of the housing, stop means in said housing through which said coil spring means extend, a piston slidably mounted within the housing, the remaining end of said coil spring means bearing against said piston, a compression spring bearing against said stop means and said piston, an extension integral with said piston through which said rod extends, an abutment on said brake operating rod against which said extension abuts, and means for introducing fluid under pressure to the outer end portion of the housing whereby upon failure of fluid pressure said compression spring means abruptly actuates said piston moving said operating rod for brake application, said stop means and said piston having guide surfaces thereon positioning said compression spring away from interference with said coil spring.

5. Brake actuating mechanism comprising a closed housing having inner and outer end walls, a flexible diaphragm within said housing and peripherally secured in place, means for introducing fluid under pressure to said housing adjacent the inner end wall thereof and at one side of said diaphragm, a brake operating rod on the other side of said diaphragm and axially arranged relative thereto, a pad on the end of said rod abutting said diaphragm, said rod projecting through the outer end wall of said housing for reciprocatory movement, coil spring means bearing at one end against said pad for urging said rod and the diaphragm in a direction toward the inner end wall of the housing, stop means in said housing through which said coil spring means extends, a piston slidably mounted within the housing, the remaining one of said coil spring means bearing against said piston, a compression spring bearing against said stop means and said piston, said piston having a bore therethrough through which said rod extends, abutment means on said rod against which said piston abuts, and means for introducing fluid under pressure to the outer end portion of the housing whereby upon failure of fluid pressure said compression spring means abruptly actuates said piston moving said operating rod for brake application.

6. Brake actuating mechanism comprising a closed housing having inner and outer end walls, a flexible diaphragm within said housing and peripherally secured in place, means for introducing fluid under pressure to said housing adjacent the inner end wall thereof and at one side of said diaphragm, a brake operating rod on the other side of said diaphragm and axially arranged relative thereto, a pad on the end of said rod abutting said diaphragm, said rod projecting through the outer end wall of said housing for reciprocatory movements, coil spring means bearing at one end against siad pad for urging said rod and the diaphragm in a direction toward the inner end wall of the housing, stop means in said housing through which said coil spring means extends, a piston slidably mounted within the housing, the remaining end of said coil spring means bearing against said piston, a compression spring bearing against said stop means and said piston, said piston having a bore therethrough through which said rod extends, abutment means on said rod against which said piston abuts, and means for introducing fluid under pressure to the outer end portion of the housing whereby upon failure of fluid pressure said compression spring means abruptly actuates said piston moving said operating rod for brake application, said stop means and said piston having guide surfaces thereon positioning said compression spring away from interference with said coil spring.

7. A safety brake actuating device adapted to be mounted adjacent to and having operable connection with the braking mechanism of a motor vehicle comprising, a closed housing divided into inner and outer compartments, a flexible diaphragm peripherally secured in the outer compartment, a brake operating rod surmounted by a diaphragm abutment plate extending axially through the inner and outer compartments and having attachment to the operable connection with the braking mechanism, a piston slidably mounted within the inner compartment equipped with a tubular axial extension surrounding and having abutting engagement at its inner end with said rod, an annular stop forming the partition between the inner and outer compartments, a rod operating compression spring unit between said stop and piston, a rod return compression spring between the diaphragm abutment plate and piston, separate seals between the tubular piston extension and the housing and between the piston and the brake operating rod, separate air inlets for introducing compressed air to the inner compartment between the piston and the inner end of the housing and to the outer compartment between the diaphragm and the outer end of the housing, and vent openings in the outer compartment between the diaphragm and piston.

References Cited in the file of this patent
UNITED STATES PATENTS 2,809,723    Howze _____ Oct. 15, 1957
2,854,954    Howze _____ Oct. 7, 1958